May 26, 1970     A. MICHELSON     3,513,731
BAR PEELING DEVICE
Filed Sept. 11, 1967     4 Sheets-Sheet 1
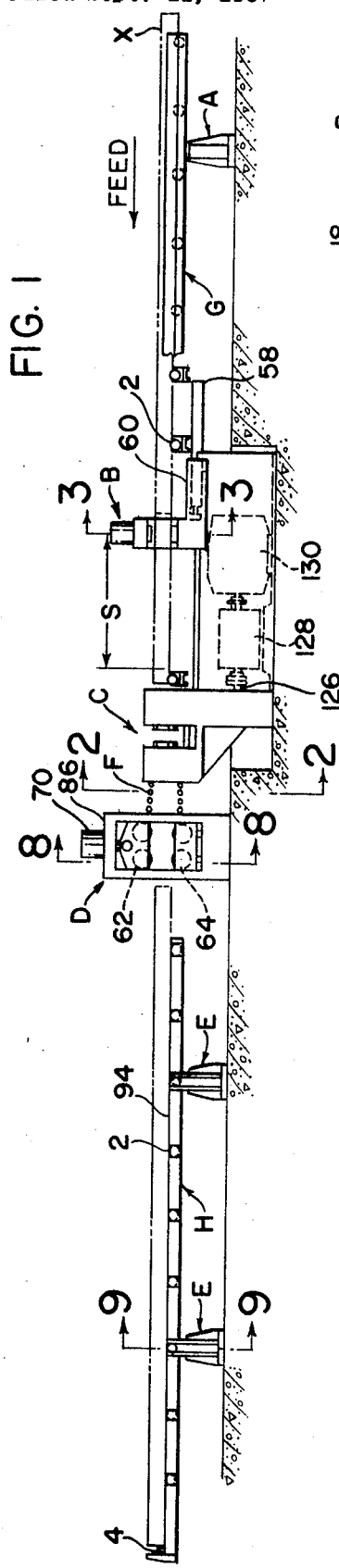
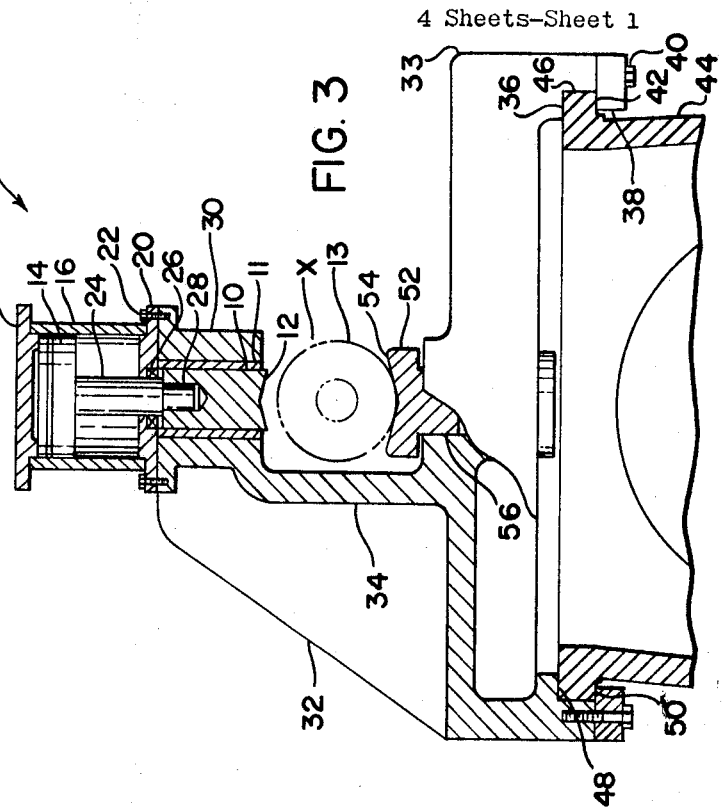
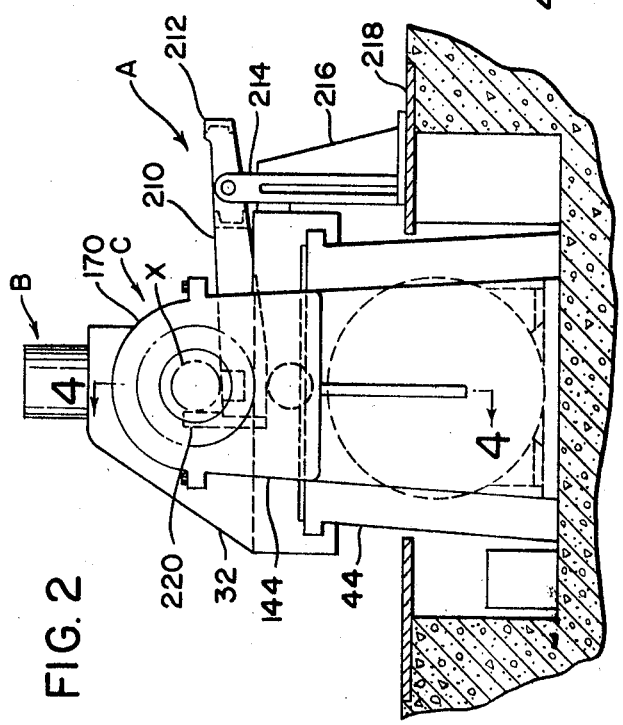
INVENTOR.
ANATOL MICHELSON
BY
Meyer, Tilberry & Body
ATTORNEYS

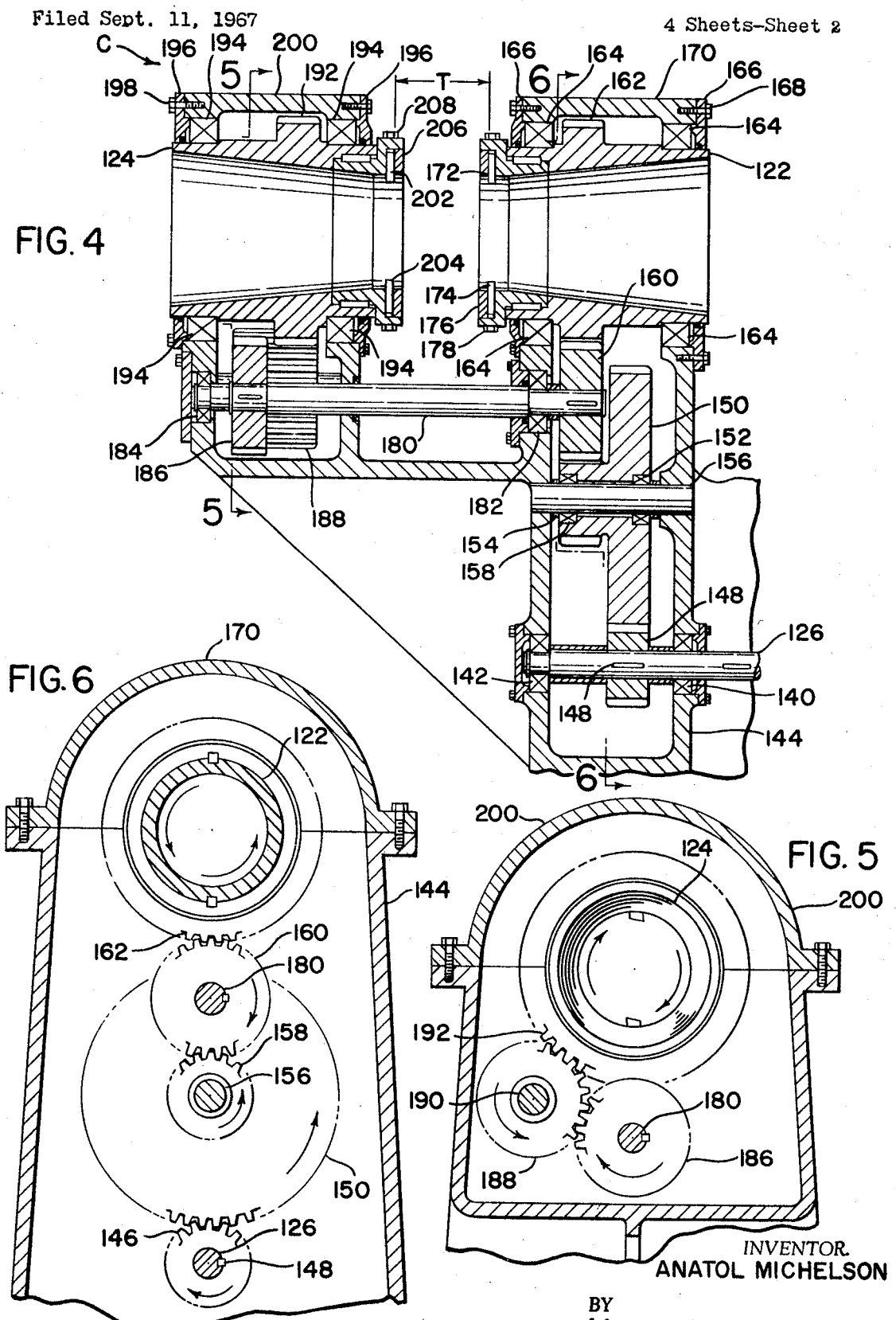

May 26, 1970  A. MICHELSON  3,513,731
BAR PEELING DEVICE

Filed Sept. 11, 1967  4 Sheets-Sheet 3

INVENTOR.
ANATOL MICHELSON
BY
Meyer, Tilberry & Body
ATTORNEYS

May 26, 1970     A. MICHELSON     3,513,731
BAR PEELING DEVICE
Filed Sept. 11, 1967     4 Sheets-Sheet 4
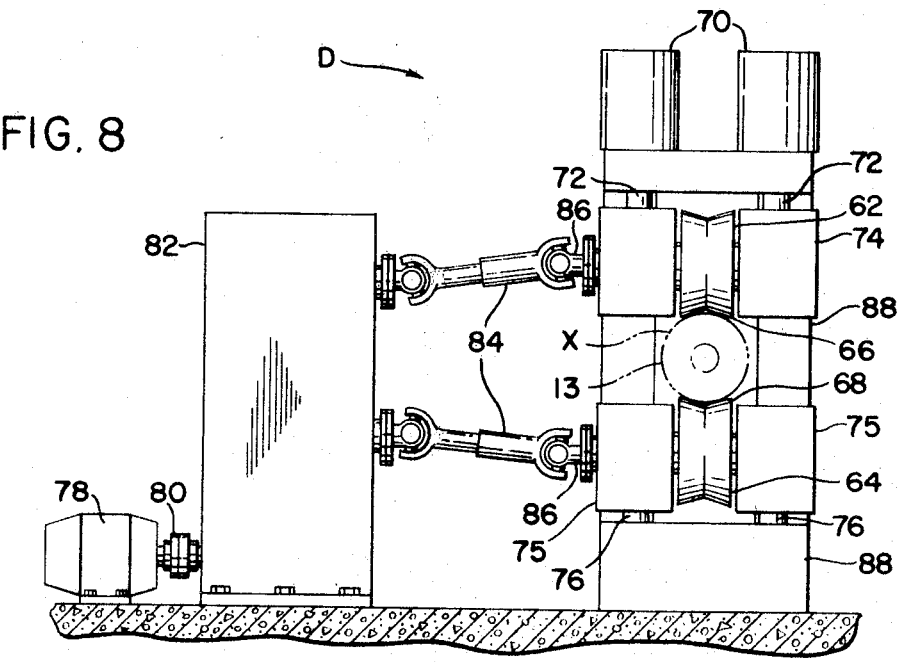
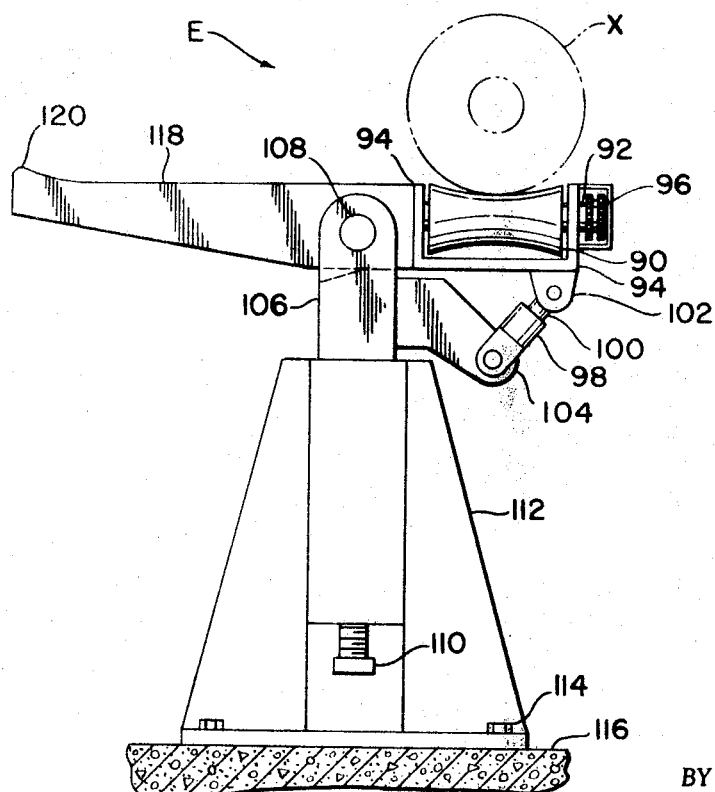
INVENTOR.
ANATOL MICHELSON
BY
Meyer, Tilberry & Body
ATTORNEYS

United States Patent Office 3,513,731
Patented May 26, 1970

3,513,731
BAR PEELING DEVICE
Anatol Michelson, Glenolden, Pa., assignor to E. W. Bliss Company, Canton, Ohio, a corporation of Delaware
Filed Sept. 11, 1967, Ser. No. 667,631
Int. Cl. B23b 5/00
U.S. Cl. 82—20                                     7 Claims

ABSTRACT OF THE DISCLOSURE

The invention is an improved bar peeling device comprising a feed charging unit for receiving long bars from a crane, or other device, a feed platform, a workpiece receiving unit that reciprocates on the feed platform and pushes a workpiece forward, a work turning device, or head, for reducing the diameters of bars fed therein by the workpiece receiving unit, and a stationary withdrawal unit for pulling the workpiece through the turning device. In particular, the invention involves a turning device or head having two separate cutting heads spaced relatively close together and revolving in opposite directions for reducing torsional stresses within the workpiece. The invention also discloses a novel arrangement of the turning head, the stationary withdrawal unit and the reciprocating workpiece receiving unit.

---

The present invention pertains to the art of metal working and cutting, and more particularly to an improved bar peeling device.

The invention is particularly adapted for turning the outer surface of a relatively long bar preparatory to drawing the bar into wire, and it will be described with particular reference thereto; however, the invention has more general application and may be used to turn other bar like members having various lengths and for various purposes. The invention could be used in turning hollow workpieces or workpieces having noncircular cross sections.

It is common practice to turn the outer surface of a long metal bar to improve its concentricity. Generally, this is done without the use of any bar centering means, especially when the accuracy of the final workpiece is not extremely critical. This particular procedure is often used as a preliminary step in the wire drawing industry to remove blemishes, slag inclusions and other foreign substances from the surface of a bar prior to drawing the bar into a small diameter wire.

It has become common practice to reduce the outer diameter of a long cylindrical or semi-cylindrical metal bar by a cutter head rotatable about the bar rather than by a conventional lathe wherein the workpiece is rotated and the cutting tool remains stationary. The usual procedure is to clamp the bar on one end with a reciprocating workpiece receiving unit which reciprocates on a machined bed surface at the same speed that the cutting head is turning metal from the bar. The main disadvantage with this arrangement is that with large length-to-diameter ratios unacceptably large buckling and torsional stresses are created in the bar. Another disadvantage lies in the fact that long and expensive machined beds must be provided for the reciprocating receiving unit where long bars are being turned. Still another disadvantage of the prior art devices is that the bar is pushed through the device by the workpiece clamping mechanism which creates a tendency to buckle the workpiece.

To overcome these disadvantages in the prior art, it has been proposed, as illustrated in the United States Pat. No 2,389,556 by W. Siegerist, to work on extremely long bars or workpieces in a bar peeler by providing two separate workpiece receiving units which alternately clamp the workpiece while the other unit is reciprocated free of the bar for taking a new grip on the bar.

It has been found that the appaartus illustrated in the Siegerist patent is deficient in several aspects. The use of two separate feed clamping units is expensive and requires elaborate mechanisms. The conventional single work removing cutter head develops large torsional forces on the bar between the work receiving unit or clamping unit and cutter head.

The present invention is directed to an improved apparatus for turning long bars or workpieces with a minimum number of clamping units and for providing a reduction of torsional forces on the bar while being machined (via the use of a novel double cutter head arrangement).

In accordance with the present invention, a work turning arrangement is provided for turning bars having a high length to diameter ratio. This novel arrangement allows a single work turning head to be used on bars, rods, pipe or other similar workpieces of greatly varying diameter and allows one machine to turn workpieces having a larger range of diameter than was previously possible. In addition, the present invention provides a more economical turning unit than was previously possible because of the absence of extremely long and costly machine guide surfaces or beds for supporting the reciprocating motion of workpiece clamping devices. These machined guide surfaces or beds, in some workpiece turndevices, are twice as long as the workpiece itself. It can be easily appreciated the substantial cost savings resulting in the manufacture of such a turning device when it is realized that in some applications the workpieces may be as long as forty feet, which would necessitate machined guide surfaces or beds having a length of about eighty feet.

The present invention provides an improved turning head arrangement which eliminates a considerable portion of the high clamping forces required in the prior art to prevent the workpiece from rotating. At large magnitudes of cutting depth and rates of turning, the cutting torsional forces exerted on the workpiece can be extremely high where only a single turning head is provided. Such high torsional forces require extremely high clamping force by the workpiece receiving means, and such clamping forces necessitate very heavy and expensive machine construction. Also there is the danger of workpiece deformation by the clamping jaws. Such deformations can be very troublesome, for example, where the elongated workpiece is, subsequent to turning, used in a wire drawing operation. The improved turning head of the present invention eliminates the requirement of high clamping forces by providing two turning heads with cutting tools thereon with the turning heads rotating in opposite directions to thereby eliminate, or at least nullify in part, the torsional stresses within the workpiece and reduce the clamping forces on the bar required by the workpiece receiving unit.

The present invention provides a specific turning machine constructed to reduce the length-to-diameter ratio between the cutting tools of the two oppositely rotating heads. The reduction of this ratio is accomplished by providing a novel cutter arrangement wherein the first of two cutter heads is rotated in a first direction and a second cutter head is rotated in a second direction with close spacing between the two cutter heads. This close spacing between the cutter heads along the axial direction of the workpiece reduces the length to diameter ratio subjected to a torque to an absolute minimum and thereby allows the turning machine of the present invention to be used with much smaller diameter workpieces or even thin-walled workpieces.

In accordance with the present invention, there is provided a work feeding mechanism for feeding long workpieces into and out of a work turning device. The mechanism comprises a workpiece receiving unit for feeding workpieces into the work turning device, which unit is mounted for reciprocation on a machined bed and provided with means for selectively gripping workpieces fed into it, and a workpiece withdrawal unit at the exit end of the work turning device which withdrawal unit is provided with opposed rollers. Actuating means are also provided to move the rollers in rolling contact with the workpiece so as to enable the withdrawal unit to remove the workpiece from the turning device.

In accordance with a specific aspect of this invention there is provided a workpiece turning device which has first and second cutter heads mounted for rotation about a workpiece fed thereinto. Mounted on the heads are tools for turning the workpiece. The heads are provided with means to rotate them in opposite directions to one another and the heads are spaced closely together along the workpiece length. The close spacing of the heads and the opposite directions of rotation reduce the torsional strains on the workpiece.

The primary object of the present invention is to provide an improved device for turning of long workpieces, which device is economical to build, provides optimum turning speeds and accommodates a wide range of workpiece diameters.

Another object of the present invention is to provide an improved work feeding mechanism for use in a work turning device of the centerless type, which mechanism includes a positive feed means at both the entrance and exit ends of the work turning device and has a minimum number of components.

Still another object of the instant invention is to provide a heating means at the exit end of the workpiece turning device, which heating means is used to remove undesirable foreign matters from the outer surfaces of the workpiece and, thus, increase the frictional properties of the workpiece.

Still further object of this invention is the provision of a novel work turning device having two separate work turning heads that rotate in opposite directions to produce oppositely directed torques on the workpiece and which are closely spaced along the axial direction of the workpiece to reduce the length of workpiece subjected to opposing torques.

Still a further object of this invention is to provide an improved overall set up for receiving elongated workpieces, feeding them into a work turning device, positively moving the workpieces after turning from the turning device to a discharge platform, and discharging the workpiece from the discharge platform whereby long workpieces of various diameters can be turned as required for a particular operation with a minimum amount of work area required for the overall set up.

An additional object of this invention is the provision of a sensor means at the far end of the discharge platform for sensing the presence of long workpieces and to generate a signal to discharge the workpiece from the discharge platform.

These and other objects and advantages will become apparent from the following description used to illustrate the preferred embodiment of the invention as read in connection with the accompanying drawings in which:

FIG. 1 is a side plan view of the overall arrangement of the invention showing the main components thereof;

FIG. 2 is a vertical cross section taken generally along line 2—2 of FIG. 1 and showing the work turning cutter head;

FIG. 3 is a vertical cross section taken generally along line 3—3 of FIG. 1 and illustrating the details of the workpiece receiving unit with portions cut away;

FIG. 4 is an elevational view taken generally along line 4—4 of FIG. 2 and showing the structural details of the work turning cutter head;

FIG. 5 is an elevational view taken generally along line 5—5 of FIG. 4 and illustrating the gear train for one of the cutter heads;

FIG. 6 is a view similar to FIG. 5 taken generally along line 6—6 of FIG. 4;

FIG. 8 is an elevational view taken generally along line 8—8 of FIG. 1 and showing the drive arrangement and certain details of the clamping withdrawal unit with portions thereof shown in perspective;

FIG. 9 is a generally perspective view of the feed discharge unit taken generally along line 9—9 of FIG. 1 with the workpiece showing in phantom line; and, FIG. 10 is a modification of the work removing cutter head shown in FIGS. 4–6 in which there is provided a single cutting head.

Figure 7:
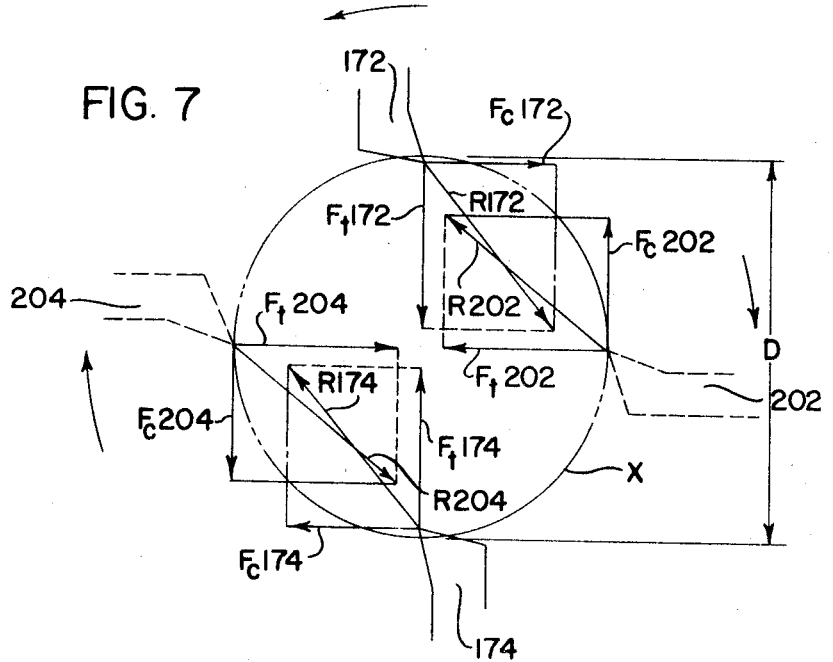
FIG. 7 is a free body diagram of the cutting and thrust forces produced by the cutting heads upon the workpiece.

Referring now to the drawings wherein the showings are for the purpose of illustrating the preferred embodiment of the invention only and not for the purpose of limiting same, FIG. 1 shows a device constructed in accordance with the present invention. The main components of the apparatus and their general functions will be explained before considering the details of these components.

On the right hand side of FIG. 1 a workpiece X is shown in phantom lines. This workpiece is fed onto a receiving platform G by suitable conveyor means, such as a crane or other similar device, not shown, and with the aid of a workpiece charging device A, best shown in FIG. 2. Mounted on the receiving platform are a plurality of rollers 2 which aid in rolling the workpiece toward the workpiece receiving means B, best shown in FIG. 3. The workpiece X is fed into the work turning device C by a reciprocating workpiece receiving means B. The workpiece X after exiting from work turning device C travels past an induction heater F which heats the workpiece to a relatively high temperature to remove any coolant, lubricant, or other impurities on the workpiece surface. This aids in the frictional properties of the workpiece surface. The workpiece then passes to a clamping withdrawal unit D, best shown in FIG. 8, which holds the workpiece while it is being turned in C and also positively withdraws the workpiece out of the work turning device C and discharges it onto a platform H. The long workpiece is then fed by the withdrawal unit D until it reaches the distal end of the discharge platform H whereupon it engages a sensing device 4. Sensing device 4, by means not shown, signals the workpiece discharge units E, best shown in FIG. 9, that remove the workpiece from the discharge platform.

Referring to FIG. 3, wherein the workpiece receiving means B is shown in greater detail, the workpiece X is shown in phantom lines and has an outer surface 13 which is engaged by a movable upper clamping element or jaw 10 mounted in a bushing 11. The clamping jaw has a clamping surface 12 that positively engages the workpiece outer surface 13. Upper clamping jaw 10 is actuated by a hydraulic piston 14 which reciprocates in a hydraulic cylinder 16 having a cylinder head 18 and a cylinder baseplate 20. The hydraulic cylinder 16 is connected to the clamping jaw 10 by a piston rod 24, is guided in the baseplate by bearing 26, and is connected to the clamping jaw 10 by a threaded piece 28. Bolts 22 connect the cylinder base 20 with a frame 30. A web 32 and a C-shaped portion 34 integrally connect a base 33 to a frame 30. The base 33 has a machine base guide surface 36. Bolted on base 33 by bolts 40 is a bottom guide piece 38 having a guide surface 42 thereon which slides on a machined bottom surface 50 of the slide 46 mounted integral with a support platform 44. An upper machined surface 48 slidably contacts surface 36. A lower clamping jaw 52 has a clamping surface 54 for engaging the outer surface 13 of the workpiece and is guided by a guide surface 56 which is integral with the base 33. The clamping surfaces 12 and 54 of the upper and lower jaws may be serrated to provide a better clamping action.

The structure for reciprocating the workpiece receiving means B is shown in FIG. 1 and comprises a conventional double-acting hydraulic cylinder 58 connected to a drive assembly 60 which, in turn, is connected to the base 33. During a typical operation of the workpiece receiving means, piston 14 of the hydraulic cylinder 16 is in the upward position along with the upper movable clamping jaw 10 allowing the workpiece X to be fed transversely in between the jaws 10 and 52. The C-shaped portion allows transverse feeding so that the workpiece need not be fed axially into receiving means B. The piston 14 is then actuated downwardly causing the jaw 10 to grip the workpiece X and the double-acting cylinder 58 is next actuated causing the workpiece receiving means to slide forward in the feed direction, shown in FIG. 1, feeding the workpiece into the work turning device. When the workpiece receiving means B completes one stroke of a distance S, as shown in FIG. 1, the double-acting cylinder 58 is actuated in the reverse direction. The piston 14 is actuated upwardly removing the clamping action of the jaw 10 and the workpiece receiving means B is reciprocated back to its initial position. The forward movement of the workpiece allows initial turning of the workpiece. The cycle of device B is repeated for the next successive workpiece to be machined. During most of the turning operation, the means or device B is inactive.

FIG. 8 shows the details of the clamping withdrawal unit D. The workpiece X shown in phantom lines is engaged on its outer surface 13 by upper engaging rolls 62 and lower engaging rolls 64 which have workpiece engaging surfaces 66 and 68, respectively. The upper engaging rolls are moved in a vertical direction to accommodate workpieces of various sizes by hydraulic cylinders 70 having piston rods 72 which are connected through upper chucks 74 for moving the upper engaging rolls 62 as desired to fit the workpiece size. The lower engaging rolls 64 have only limited vertical movement which is provided by adjusting screws 76. The rotating driving force for the upper and lower rolls is provided by a driving motor 78 coupled to a gear transmission box 82 by a drive shaft 80. The drive arrangement is such that the drive speed for the rolls can be varied in accordance with the speed of the turning machine C thereby providing a controlled speed drive. Universal drive shafts 84 are connected to roller axles 86 mounted in the upper and lower respective chucks for the upper and lower rolls. The entire assembly is supported on a support frame 88.

In operation, when a workpiece is fed out of the exit end of the work turning device C by the device B, the hydraulic cylinders 70 actuate the upper rollers 62 so they are in their upper positions and thereby allow the workpiece X to be fed therebetween. The hydraulic cylinders 70 are next actuated in the downward direction causing the upper roller 40 to clamp tightly against the workpiece and the drive motor 78 for the clamping withdrawal unit is then engaged and the rolls 62 and 64 advance the workpiece X toward the discharge platform and pull the workpiece through the turning station. The rolls not only advance the workpiece, but they also provide a good clamping hold upon it when the workpiece receiving means B is reciprocated back to its original position, as shown in FIG. 1. This clamping action of the clamping withdrawal unit D therefore allows the turning device C to work on the workpiece at all times.

Referring to FIG. 9, the workpiece discharge unit E is shown in greater detail with the workpiece X shown thereon in phantom lines prior to its discharge. The discharge platform H is equipped with two workpiece discharge units E both of which are identical. The discharge rollers 90 are mounted in axles 92 which, in turn, are supported on a support beam 94 that runs the entire length of the discharge platform. The axles 92 are power driven through a drive sprocket, by motor means not shown, for rotating the rolls 90 to aid in the discharge of the workpiece from the withdrawal unit D. A hydraulic cylinder 98 through a piston rod 100 and hinge bracket 102 provides pivoting force for the support beam and the rollers thereon allowing the entire assembly to pivot at certain times during the cycle. The hydraulic cylinder 98 is supported on an angle bracket 104 which in turn is integral with the axle 106. The axle 106 has a trunnion 108 on its upper end for providing pivoting movement for the above-described apparatus and an adjusting screw 110 on its bottom portion for providing limited axial movement of the axle. The axle is supported in its vertical movement by a base support frame 112 which in turn is bolted to the floor by bolts 114. Mounted on the trunnion 108 is the discharge arm 118 with an abutment surface 120.

In operation, after the workpiece X has been discharged from the work withdrawal means D it is advanced along the discharge platform by powered rollers 90, shown in FIG. 9, until it reaches the distal end of the discharge platform H where it abuts a sensor 4, whereupon through means not shown, the hydraulic cylinders 98 are actuated causing the arms 118 and beam 94 to pivot about the axles 106 causing the workpiece to roll onto the discharge arms 118 up to abutments 120 whereupon it is picked up by a crane or other suitable device.

The work turning device C will be described by referring to FIGS. 4–6 which show a preferred embodiment having two cutting heads. The driving arrangement for the first cutter head 122 and the second cutter head 124, as shown in FIG. 1, comprises a power drive shaft 126 connected to a speed transmission 128 and a motor 130 connected to the speed transmission. Drive shaft 126 is supported for rotation by drive shaft support bearings 140 and 142 which in turn are supported in the cutter head framework 144. A drive shaft pinion 146 is keyed to the shaft 126 by a key 148 and meshes with an intermediate gear 150. Intermediate gear 150 is mounted on intermediate shaft 156 which in turn is supported by intermediate gear bearings 152 and 154 and integral with gear 150 is an intermediate shaft pinion 158 that in turn meshes with the first cutter head pinion 160. Pinion 160 meshes and drives first cutter head gear 162 which is integral with the first cutter head 122; 122 being supported for rotatable mounting by four bearings 164 which bearings are connected to a cover plate 170 by face plates 166 which are bolted thereto by bolts 168. Cutting tools 172 and 174 for the first cutter head are mounted in a die plate 176 and are adjusted by screws 178. Cutter head pinion 160 is mounted on a pinion shaft 180 which is supported by shaft bearings 182 and 184. On the other end of shaft 180 is a second cutter head gear 186 which meshes with a reversing gear 188 (see FIG. 5) that in turn meshes with a second cutter head gear 192. Reversing gear 188 is mounted for rotation on shaft 190. Gear 192 is integral with the second cutter head 124 and is mounted for rotation on four bearings 194. The bearings 194 are held in place by face plates 196 which are bolted by bolts 198 to a cover plate 200. The cutter tools 202 and 204 are mounted on a die plate 206 and have vertical adjustment screws 208.

Referring to FIGS. 5 and 6, it can be seen that the first cutter head 122, shown in FIG. 6, rotates in a counterclockwise direction as viewed from the exit end of the unit C whereas the second cutter head 124, shown in FIG. 5, rotates in a clockwise direction. Mounted on the second cutter head are the two diametrically opposed tools 202 and 204 which rotate about the workpiece fed therein and turn work from the surface of the workpiece X in the conventional fashion. Mounted on the first cutter head are the two work tools 172 and 174 which are also diametrically opposed to each other and that rotate about the workpiece to turn work from the surface thereof. By the present arrangement shown and with further studies of FIGS. 5 and 6, it can readily be appreciated that a novel arrangement has been provided whereby a single drive shaft 126 through suitable gear arrangement causes the two cutter heads to rotate in opposite directions.

Referring to FIG. 7, the reason for the oppositely rotating cutter heads will now be further explained. FIG. 7 shows a free body diagram of the workpiece X as it is being acted upon by the cutting forces of the tools 172, 174, 202, 204. The cutter tools 172 and 174 belong to the first cutter head and rotate in a counterclockwise direction while a second set of tools 202 and 204 are mounted on the second cutter head and rotate in a clockwise direction. When the cutting tools are engaging the workpiece the cutting forces involved are a thrust force $F_t$ acting perpendicular to the circumference of the workpiece and a cutting force $F_c$ acts tangentially thereto. If a single set of cutting tools rotating in the same direction such as 172 and 174 were to be used the forces of the thrust force $F_t$ 172 and $F_t$ 174 would obviously neutralize each other if they were approximately equal, but the cutting forces $F_c$ 172 and $F_c$ 174 respectively, due to the cutting forces of the tools 172 and 174, would tend to rotate the workpiece in a clockwise direction and these two forces would be cumulative to one another. Obviously, there would have to be some strong clamping means to counteract this cutting force acting on the workpiece to keep it from rotating; however, in the preferred embodiment of this invention wherein two cutting heads are provided the cutting forces $F_c$ 172 and $F_c$ 174 are neutralized by the cutting forces $F_c$ 202 and $F_c$ 204 produced by the tools 202 and 204, shown in phantom lines in FIG. 7. The resultant of the cutting force $F_c$ and thrust force $F_t$ for each of the tools is designated by R172, R174, R202, and R204, for the respective tools 172, 174, 202 and 204. The cutting forces then neutralize one another and if the cutting depth of the tools is properly arranged so that approximately equal depth cuts are taken on the workpiece there will be a condition wherein there is no torque in the workpiece except between the cutting tools themselves and a minimum of clamping force can be used to hold the workpiece in position. This neutralization of torques by the use of oppositely turning cutting heads is very advantageous because at large magnitudes of cutting depth and rate of peeling necessary for high productivity, the cutting force can be well over a quarter of a million pounds and subsequently a large clamping force will be required to hold the workpiece in position. This clamping force can be as much as three-fourths of a million pounds presuming that the friction coefficient between the clamp and workpiece is 0.3. Such a high clamping force necessitates very heavy machinery construction and contains the danger of workpiece deformation by clamping jaws. In the preferred embodiment of this invention, as shown in FIG. 4, the distance between the cutting tools of the two heads is designated by the distance T. By keeping the distance T at a minimum distance, it can be appreciated that the ratio $T/D$, which represents the ratio of the workpiece length exerted to torque over the diameter of the piece, can be thereby kept to a minimum. This ratio of $T/D$ can be very important when thin-walled rods or cylinders such as pipe or relatively thin diameter pieces are being turned. In one preferred form of this invention wherein the cutting head was designed to turn down workpieces within the range of 13 inches maximum diameter and 3½ inches minimum diameter, the $T/D$ range was found to be within the range of 1–4, which allowed for heavy cuts by the turning head without the danger of buckling and excessive torsional strains in the workpiece. The $T/D$ range, however, can be varied to fit various usages of the machine and it has been found that ranges such as ranges from 0.1 to 6 for $T/D$ are acceptable for the vast majority of products that would be turned down in this type of machine.

Figure 10:
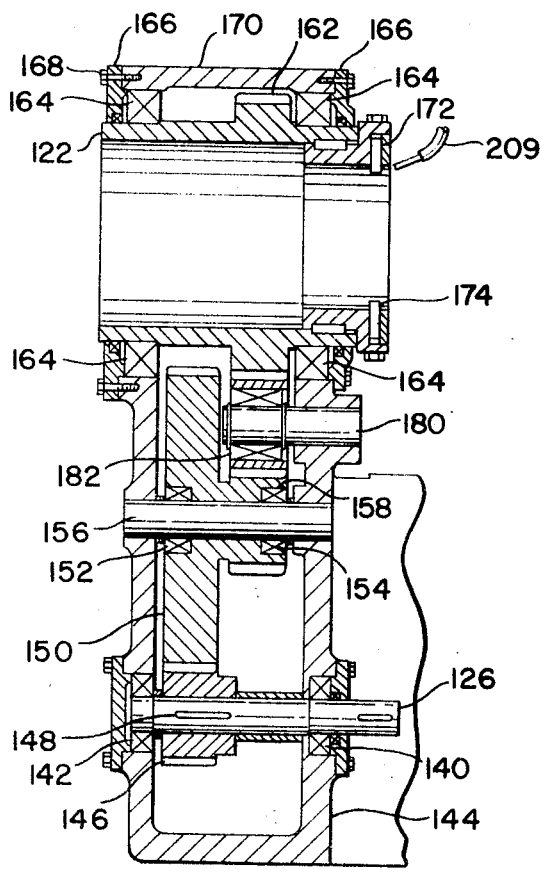

FIG. 10 is a modification of the turning head used in FIG. 4. The turning head of FIG. 10 has one single rotating head 122, which is driven through a gear train by a drive shaft 126. The other elements of the invention are similarly numbered, as shown in FIG. 4. In addition, a cooling and lubricant line 209, which is conventional in the art, is provided. Obviously, the coolant and lubricant line 209 can also be used with a double-cutting head modification of FIG. 4. The modification of FIG. 10 is more economical to manufacture and may be used in those usages where small rod or workpieces are being turned down or where the cut being taken on the workpiece is minimal.

Reference is now had to FIG. 2 which shows some of the details of the workpiece charging device A which is used for initially receiving the workpieces X and that is mounted on the feed platform G. The workpieces are fed onto the charging arm 210 and rolled down the incline thereof until they abut against the bumper stop 220 which is part of the feed platform. The charging arm 210 is vertically supported by the axle piece 214 that is stationarily supported by a bracket 216 and baseplate 218. The primary function of the workpiece charging device is to facilitate the entrance of the workpieces X into the work receiving means B.

The machine operation during one turning or peeling occurs as follows: at the start of the operation the machine parts are in the position shown by FIG. 1 with the upper gripping jaw 10 of the workpiece receiving means B in its upward position for receiving the workpiece. The workpiece X is fed into the charging arm 210 of unit A until it hits the bumper stop 220 at which time the upper jaw of the workpiece receiving means B is drawn downward in contact with the workpiece X providing a gripping action thereon while at the same time the hydraulic cylinder 58 for the workpiece receiving means is actuated in the forward direction causing the workpiece receiving means B to be moved toward the work turning device C. The machine cutter or work turning device C is actuated so that it is running at the same linear cutting speed as the workpiece receiving means B. The workpiece is next fed through the work turning device C and when the work receiving means B reaches the end of its stroke distance S, as shown in FIG. 1, the piston 14 of the work receiving means is actuated upwardly pulling up the jaw 10 and releasing its grip on the workpiece X. The workpiece receiving means B then slides along its guided surfaces back to its original position by the actuation of the hydraulic cylinder 58, FIG. 1, and is inactive until the next successive workpiece is fed therein. As the workpiece comes out of the exit end of the work turning device C it immediately passes through an induction heater F where any oil, water or other contaminants, which may have been deposited thereon prior to and during the cutting cycle, are removed by the high temperature produced by the induction heating coils. The workpiece is then immediately fed into the work withdrawal unit D wherein the upper rolls 62 of the work withdrawal unit engage the workpiece by the actuation of hydraulic cylinders 70. The stroke distance S, which is the travel of the workpiece receiving means, and the distance between the exit end of the turning machine and the entrance of the withdrawal unit is so adjusted that the workpiece X is at all times clamped by either the work withdrawal unit or the workpiece receiving means. In this way, the turning machine C can be running at all times so that a continuous cut can be made with a simplicity of operation required. The coolant-lubricant means 209, shown in FIG. 10, of course, can be actuated simultaneously with the machine cutting head to provide lubrication and coolant therefor. The work withdrawal unit D not only clamps the workpiece X in position allowing for the machine turning but it also advances the workpiece at a controlled speed which is the same as the turning machine speed. The work withdrawal unit D pulls the workpiece out of the turning machine onto the platform H until such time as the workpiece reaches the distal end of the discharge platform H whereupon it abuts a sensor 4 which gives a signal to the work withdrawal unit D, by means not shown, to actuate the hydraulic cylinders 70 of the withdrawal unit upwardly allowing for the next cycle when the next workpiece is fed into the work withdrawal unit. The sensor 4 also actuates the cylinders 98 of the workpiece discharge units E causing the pivoting of the discharge arms 118 on both units E thereby permitting the workpiece to be rolled down the arms 118. The workpiece can then be removed by any suitable transportation means such as a crane or conveyor. The hydraulic transmission lines and the controls for the various hydraulic element and the control circuitry associated with the sensor 4 have not been shown since they form no part of this invention and to supply them would require only the application or ordinary skill which would be well within the ability of one skilled in the art.

The term workpiece as used in this description should not be limited to solid and circular workpieces, but can also be used to means non-circular workpieces such as hexagonal bar stock and can also be used to mean hollow items such as pipe. Although this mechanism is designed primarily for turning metal workpieces, it should be kept in mind that it is not to be limited to metal workpieces alone but may be used to turn any type of material which may come in elongated pieces.

The present invention has been described in connection with a specific structural embodiment; however, it is appreciated that the structural embodiment may be changed without departing from the intended spirit and scope of the present invention as defined in the appended claims.

Having thus described my invention, I claim:

1. In a work feeding mechanism of the type used for feeding elongated workpieces having a diameter D and having a leading end along a given path through a work turning device having input and exit ends, the improvement comprising: a workpiece receiving means including means for selectively gripping the workpiece, means for reciprocating said workpiece receiving means along said path toward said turning device to thereby feed said leading end of the workpiece into said input end of the workpiece turning device, said work turning device comprising a first work turning head, a second work turning head and drive means for rotating said heads in unison and in opposite cutting directions, the distance between said heads being T, and the device has a ratio of $T/D$ within the range of 1-4 whereby the opposite cutting torques applied by said heads on the workpiece are generally in opposite nullifying directions; and, workpiece withdrawal means located on said path and a short distance from said exit end of the work turning device, said withdrawal means being fixed with respect to said turning and being adapted to receive the turned workpiece exiting from said turning device, said withdrawal means comprising at least two opposed roller means for engaging said workpiece and pulling it through said turning device and means for driving said roller means at a controlled speed to pull said workpiece through said turning device.

2. The improvement as defined in claim 1 including a heating means for heating said workpiece and removing any unwanted foreign matter from the outer surface of said workpiece, said heating means being located adjacent to the exit end of said work turning device and between said turning device and said withdrawal means.

3. The improvement as defined in claim 1 wherein said workpiece receiving means includes a generally C-shaped frame with a side opening generally aligned with said path, workpiece gripping elements on opposite sides of said path, and means for opening said elements whereby a workpiece may be fed transversely through said side opening and between said elements.

4. The improvement as defined in claim 1 wherein said workpiece receiving means includes elements for clamping said workpiece guide means for allowing movement of said receiving means in a direction parallel to said path and toward and away from said turning device.

5. The improvement as defined in claim 4 wherein said receiving means includes means for opening said clamping elements when at least said receiving means is moved away from said turning device.

6. A work turning device for turning the surface of an elongated workpiece which travels in a given path and has a diameter D, the combination of: a first cutting head with an internal workpiece receiving passage, means for rotating said first head in a first direction about an axis generally coinciding with said path, a second cutting head with an internal workpiece receiving passage, said second head being spaced axially of said first head, means for rotating said second head in a second direction about an axis generally coinciding with said path, workpiece turning tool means mounted on said first and second heads and extending radially inwardly in said passages, said tool means developing opposite torques in said workpiece during the cutting at portions of the workpiece spaced axially a distance T, said tool means being located relatively close to one another along said path with the device having a ratio of $T/D$ within the range of 1-4.

7. The device of claim 6 wherein said tool means are adjusted to take substantially equal depth cuts from the workpiece during the turning thereof.

References Cited

UNITED STATES PATENTS

| 1,973,801 | 9/1934 | Dustan | 82—20 |
| 2,311,998 | 2/1943 | Pope | 82—20 |
| 3,350,965 | 11/1967 | Braver et al. | 82—20 |
| 3,363,493 | 1/1968 | Riedel | 82—20 |

FOREIGN PATENTS

| 826,189 | 12/1959 | Great Britain. |
| 894,485 | 4/1962 | Great Britain. |
| 917,202 | 1/1963 | Great Britain. |
| 1,031,218 | 6/1966 | Great Britain. |

LEONDIAS VLACHOS, Primary Examiner